United States Patent [19]

Reichl

[11] Patent Number: 4,580,346
[45] Date of Patent: Apr. 8, 1986

[54] SEALING STRIP FOR ENCAPSULATED MEASURING DEVICE

[75] Inventor: Alfred Reichl, Stein, Fed. Rep. of Germany

[73] Assignee: Dr. Johannes Heidenhain GmbH, Traunreut, Fed. Rep. of Germany

[21] Appl. No.: 481,866

[22] Filed: Apr. 4, 1983

[30] Foreign Application Priority Data

Apr. 24, 1982 [DE] Fed. Rep. of Germany ....... 3215334

[51] Int. Cl.[4] .............................................. G01B 11/02
[52] U.S. Cl. .............................. 33/125 R; 277/237 R; 277/12; 277/DIG. 4; 277/53
[58] Field of Search .................. 277/DIG. 4, DIG. 6, 277/DIG. 7, 53, 237 R, 237 A, 12; 33/125 R, 125 A, 125 C; 49/475; 405/147

[56] References Cited

U.S. PATENT DOCUMENTS

| 3,031,802 | 5/1962 | Leliaert | 277/53 |
| 3,404,487 | 10/1968 | Johnson | 49/475 |
| 3,447,244 | 6/1969 | Scholl | 33/147 T |
| 3,745,053 | 7/1973 | Johnson et al. | 49/475 X |
| 4,031,595 | 6/1977 | Welker | 33/125 C X |
| 4,376,543 | 3/1983 | Sakagami | 277/DIG. 7 |

FOREIGN PATENT DOCUMENTS

| 1223140 | 2/1971 | United Kingdom | 277/53 |
| 1541001 | 2/1979 | United Kingdom | 277/53 |

OTHER PUBLICATIONS

IBM Disc. Bulletin: "Compliant EMC Shield for Movable Covers", by Evans et al., vol. 22, #8A, 1/80.

Primary Examiner—Harry N. Haroian
Attorney, Agent, or Firm—Willian Brinks Olds Hofer Gilson & Lione Ltd.

[57] ABSTRACT

In an encapsulated measuring instrument for measuring the relative position of two objects, a scale and a scanning unit are mounted within a housing which defines a slit therein. One of the objects is connected with the scanning unit by means of a follower which extends through the slit. One or more sealing strips are provided for sealing off the slit, and each of the sealing strips includes a plurality of tightly bundled fibers.

14 Claims, 14 Drawing Figures

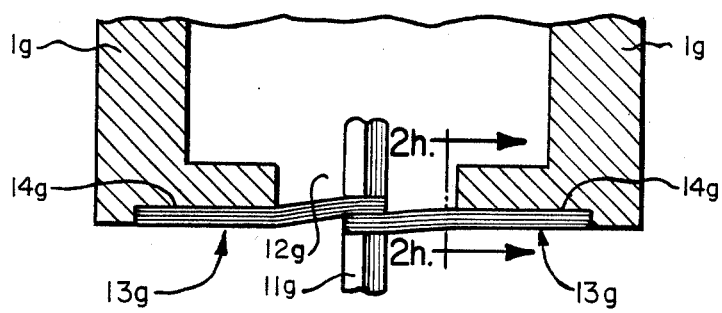
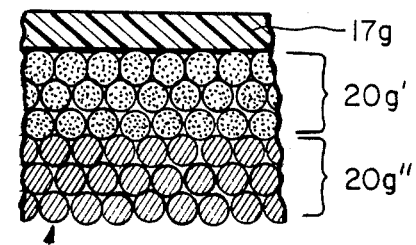
FIG. 2g  FIG. 2h
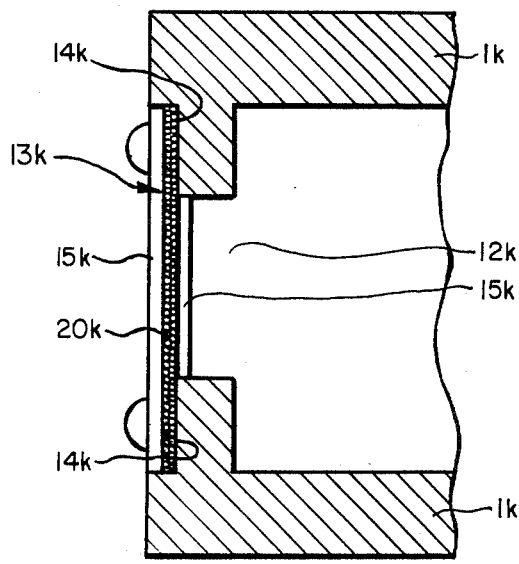
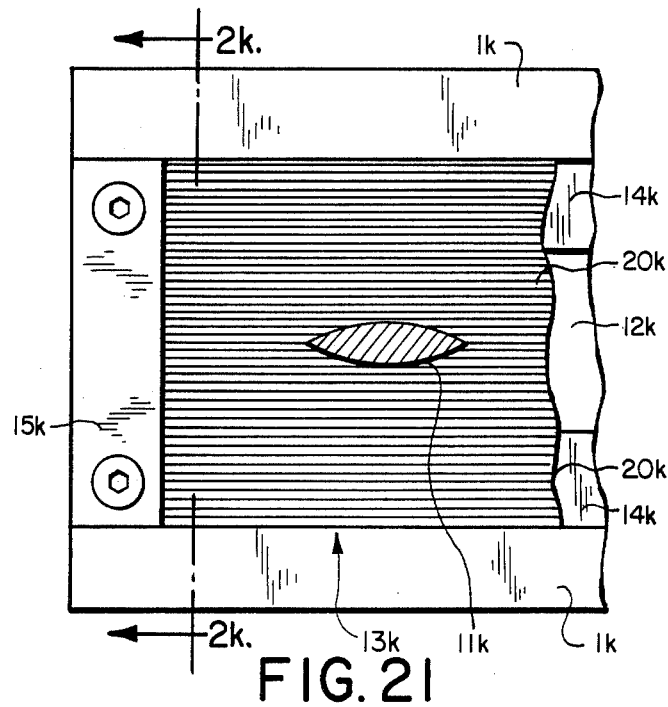
FIG. 2k  FIG. 2l
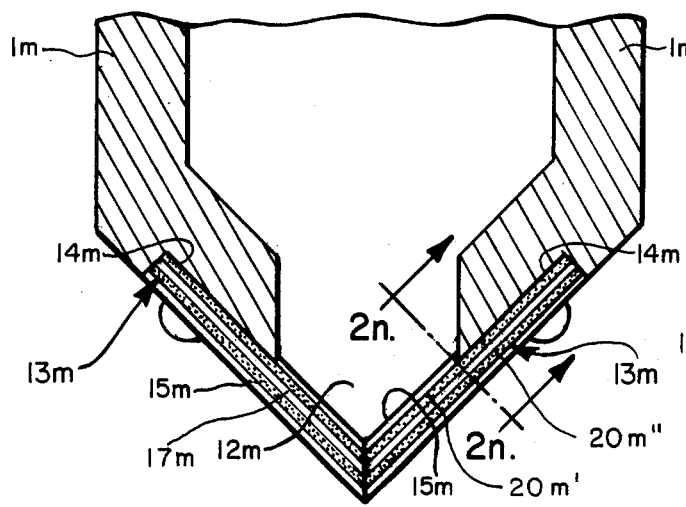
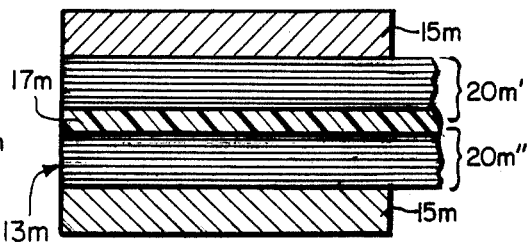
FIG. 2m  FIG. 2n

SEALING STRIP FOR ENCAPSULATED MEASURING DEVICE

BACKGROUND OF THE INVENTION

This invention relates to an improved sealing strip for use with an encapsulated measuring device of the type used to measure the relative position of first and second objects, which device includes a housing adapted to be coupled to the first object and defining a slit which extends along a measuring direction, a follower adapted to be coupled to the second object and extending through the slit into the housing, and a measuring component disposed within the housing and coupled to move with the follower.

German Patent No. 28 46 768 discloses an encapsulated length measuring device in which a scale and a scanning unit are accommodated within a housing. This housing defines a through slit which extends along the measuring direction and is closed by means of sealing elements which are arranged in a roof-like pattern and which in the disclosed embodiment take the form of plastic or rubber lips. A follower extends between the lips through the slit and serves to connect the scanning unit with an object, the position of which is to be measured.

In the aforementioned measuring device, the sealing lips must lie closely against the follower if effective shielding or sealing is to be obtained. Therefore, the sealing lips are often constructed of elastic materials having high restoring forces in order to obtain and desired sealing effect. In consequence of the mechanical properties of the materials used for the lips, frictional forces on the follower are generated by the restoring forces. As the follower moves along the measuring direction, it can be deformed by these frictional forces. Of course, such deformations are detrimental to measuring accuracy. Furthermore, because the sealing lips are bent open by the follower, it is not unusual for twists to develop along the lengthwise extent of the sealing lips. For this reason, even when the follower is provided with a sword-shaped cross-section, small zones at the ends of the follower which are not adequately closed by the sealing lips are not uncommon.

SUMMARY OF THE INVENTION

The present invention is directed to an improved sealing strip for use in measuring instruments of the general type described above. The improved sealing strips of this invention do not impair measuring accuracy, for they place relatively small forces on the follower. In addition, they permit substantially hermetic sealing of the housing.

According to this invention, an encapsulated measuring device of the type described above is provided with flexible covering means for sealing the slit around the follower as the follower moves along the slit. This covering means comprises at least one sealing strip which comprises a plurality of tightly bundled fibers. These fibers can be oriented either transversely to or longitudinally of the slit.

An important advantage of the present invention is that in the preferred embodiments described below the fiber bundles exert only an extremely slight frictional force on the follower during measuring movement. Accordingly, measuring errors due to deformations of the follower caused by the sealing strips are to a large extent avoided. Furthermore, since the individual fibers of the fiber bundles are largely independent of one another, the opening of a fiber bundle in the zone of the follower does not distort the fibers in the zones away from the follower. In this way, unclosed zones at the ends of the follower along the measuring direction are thereby largely avoided. In several of the preferred embodiments described below, the fiber bundles, which themselves provide an elastic restoring force to hold them against the follower, also act to carry a thin sealing foil or sheet. Preferably, this thin sealing foil is not capable in itself of providing any substantial restoring force, and the necessary restoring forces are provided by the fiber bundles. In this way, a sealing element which is entirely impermeable in the manner of conventional sealing lips is provided, without the disadvantages of conventional sealing lips. Since no twists develop in the thin sealing foil, substantially hermetic sealing is provided in the zone of the follower. For this reason, many embodiments of the present invention can be used in a wide variety of measuring instruments.

The invention itself, together with further objects and attendant advantages, will best be understood by reference to the following detailed description, taken in conjunction with the accompanying drawings.

BRIEF DESCRIPTION OF THE DRAWINGS

FIG. 1b is an elevational view of the length measuring device of FIG. 1a.

FIG. 2b is a sectional view taken along line 2b—2b of FIG. 2a.

FIG. 2g is a transverse sectional view of a fourth preferred embodiment of this invention.

FIG. 2h is a sectional view taken along line 2h—2h of FIG. 2g.

FIG. 2k is a transverse sectional view of a fifth preferred embodiment of the sealing strips of this invention, taken along line 2k—2k of FIG. 2l.

FIG. 2l is a plan view in partial cutaway and partial section of the measuring device of FIG. 2k.

FIG. 2m is a transverse sectional view of a sixth preferred embodiment of the sealing strips of this invention.

FIG. 2n is a sectional view taken along line 2n—2n of FIG. 2m.

DETAILED DESCRIPTION OF THE PRESENTLY PREFERRED EMBODIMENTS

Figure 1A:
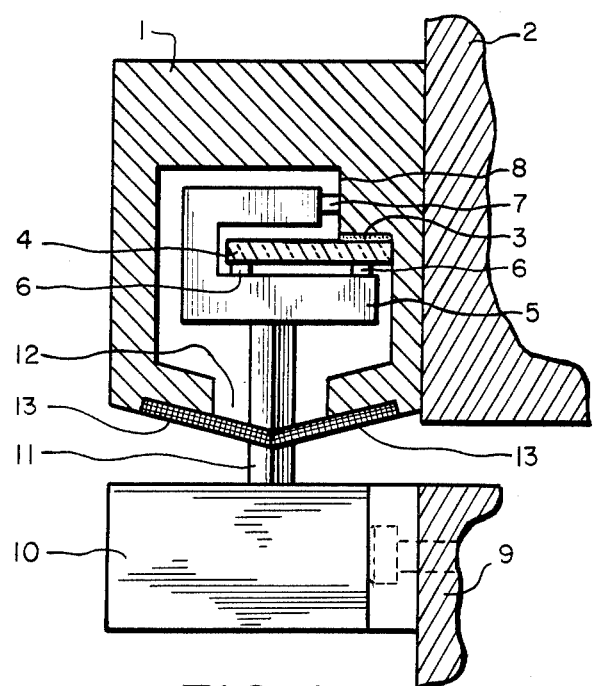
FIG. 1a is a sectional view taken along line 1a—1a of FIG. 1b, showing a cross-section of an encapsulated length measuring device suitable for use with the present invention.
Figure 1B:
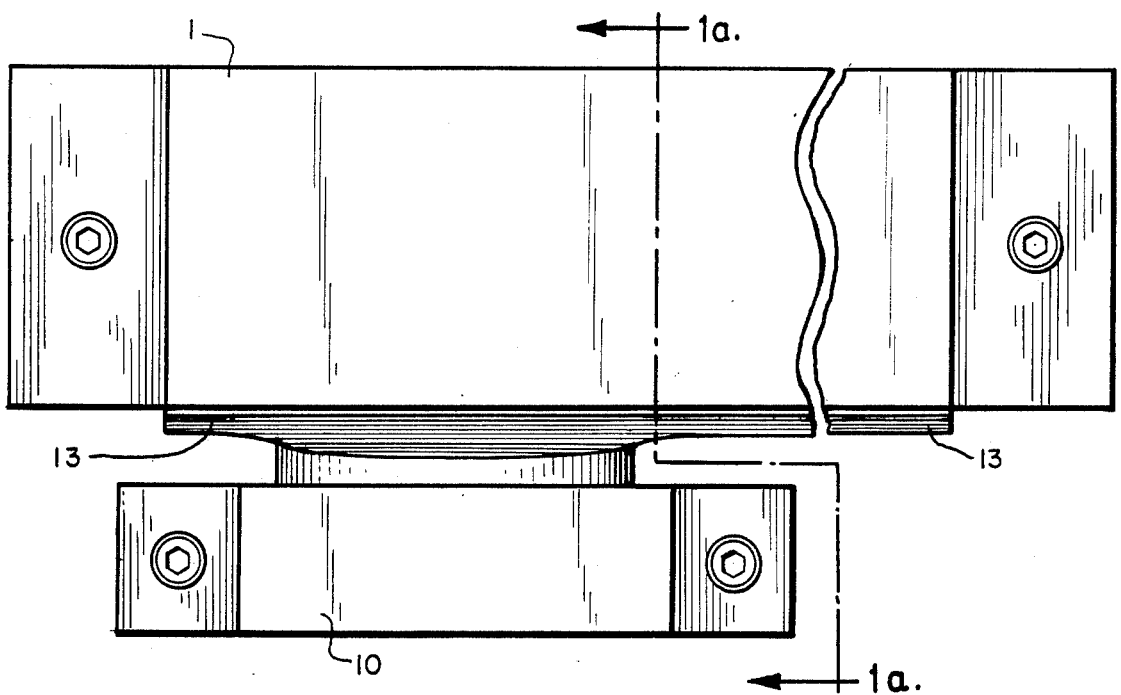

Turning now to the drawings, FIG. 1a and 1b depict a longitudinal position measuring instrument which includes a housing 1. In this preferred embodiment, the housing 1 takes the form of a hollow profile which is fastened in any suitable manner to a bed 2 of a processing machine (not shown). The housing 1 defines an interior surface to which a measuring scale 4 is mounted by means of an adhesive layer 3. This measuring scale 4 defines a measuring division which is scanned by a scanning unit 5 disposed within the housing 1. The scanning unit 5 includes (in a manner not shown) a scanning plate, an illuminating system, and a plurality of photo-sensors. The scanning unit 5 is supported with the housing 1 by means of rollers 6 which bear on the scale 4, and by means of rollers 7 which bear on a guide surface 8 defined by the housing 1. This guide surface 8 forms an auxiliary guide for the scanning unit 5. The processing machine includes a slide piece 9 to which is fastened in any suitable manner a mounting base 10. A follower 11 is secured to this mounting base 10 and extends through a longitudinally extending slit 12 defined by the housing 1. Within the interior of the housing 1, the follower 11 is coupled with the scanning unit 5 in order to transmit the motion of the slide piece 9 to the scanning unit 5. In this way, the scanning unit 5 is adapted to measure the relative position between the bed 2 and the slide piece 9. In order to prevent dirt and other impurities from penetrating into the interior of the otherwise fully enclosed housing 1, the slit 12 is closed by two sealing strips 13 which are arranged in a roof-like pattern. The follower 11 is sword shaped in cross-section and extends between the sealing strips 13.

Figure 2A:
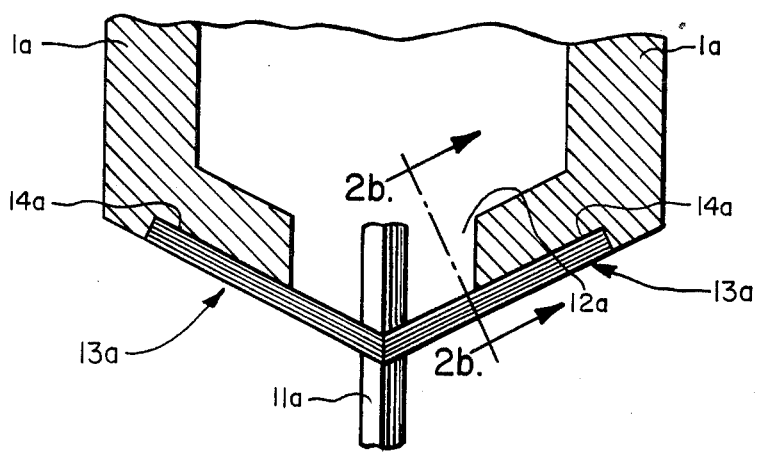
FIG. 2a is a transverse sectional view of a first preferred embodiment of the sealing strips of this invention.
Figure 2B:
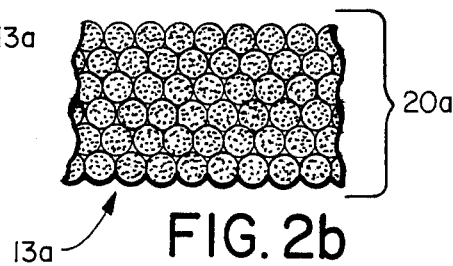

In FIGS. 1a and 1b the sealing strips 13 are represented generally. A number of embodiments of the sealing strips 13 made in accordance with the present invention are shown in enlarged views in FIGS. 2a through 2n. FIG. 2a depicts a housing 1a which defines a slit 12a, which is sealed off by two sealing strips 13a inclined against one another at a roof-like angle. A sword-shaped follower 11a extends between the two sealing strips 13a. As best shown in the enlarged sectional view of FIG. 2b, each of the sealing strips 13a is made up of a large number of tightly bundled fibers 20a. For example, in this preferred embodiment, the fibers 20a take the form of plastic (synthetic material) fibers which are oriented to run transversely to the longitudinal extent of the slit 12a and parallel to the plane of FIG. 2a. The fibers 20a are fastened by a suitable adhesive to outer surfaces 14a defined by the housing 1a adjacent to the slit 12a. The fibers 20a are aligned to abut against one another with their free ends in order to seal the slit 12a.

Figure 2C:
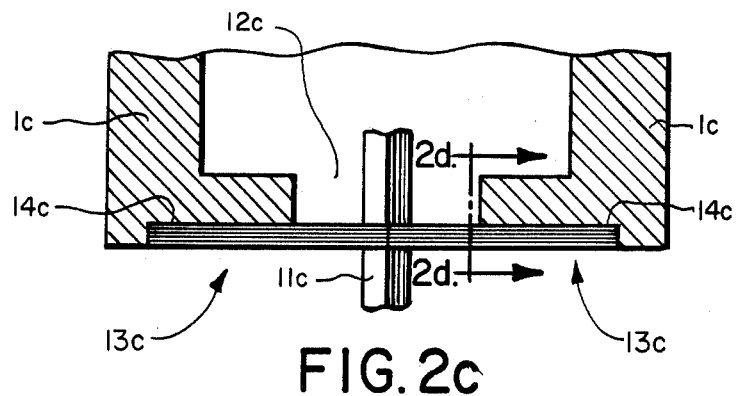
FIG. 2c is a transverse sectional view of a second preferred embodiment of the sealing strips of this invention.
Figure 2D:
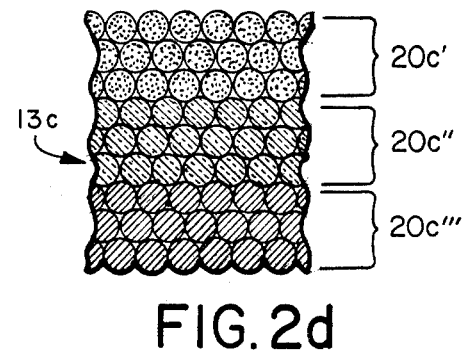
FIG. 2d is a sectional view taken along line 2d—2d of FIG. 2c.

FIG. 2c depicts a longitudinally extending slit 12c of a housing 1c which is sealed off by means of two sealing strips 13c which lie in a single plane. As shown in the enlarged sectional view of FIG. 2d, each of the sealing strips 13c comprises a plurality of tightly bundled fibers 20c',20c",20c''' which are arranged in three parallel layers. Each of the fibers of the sealing strips 13c runs transversely to the longitudinal extent of the slit 12c, and these fibers are fastened to outer surfaces 14c of the casing 1c adjacent to the slit 12c by means of a suitable adhesive. The fibers 20c', 20c", 20c''' are positioned such that their free ends abut one another at the center of the slit 12c. A follower 11c extends between the free ends of the fibers 20c',20c",20c'''. The fiber bundles 20c',20c",20c''' can comprise various materials, for example, plastic (synthetic materials), glass or metal.

Figure 2E:
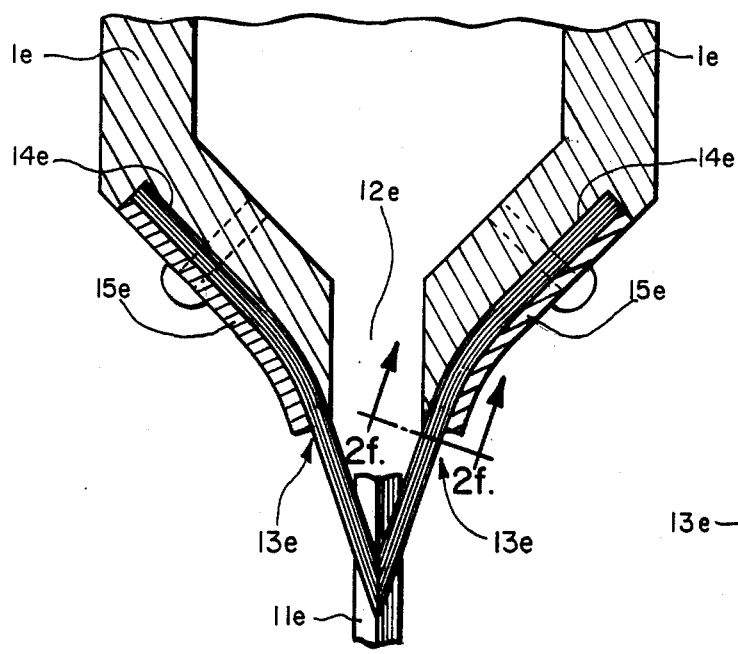
FIG. 2e is a transverse sectional view of a third preferred embodiment of the sealing strips of this invention.
Figure 2F:
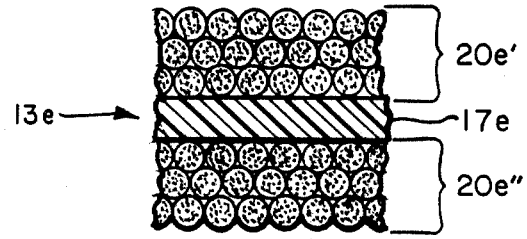
FIG. 2f is a sectional view taken along line 2f—2f of FIG. 2e.

In FIG. 2e, the slit 12e of a housing 1e is sealed off by means of two sealing strips 13e. As shown in the enlarged sectional view of FIG. 2f, each of the two sealing strips 13e is made up of two layers of fiber bundles 20e',20e", between which is mounted a thin foil 17e of a synthetic material. In this embodiment, the fiber bundles 20e',20e" can be formed of a synthetic plastic material. In this embodiment, the sealing strips 13e are fastened to curved, concave outer surfaces 14e positioned adjacent to the slit 12e by means of correspondingly curved molded parts 15e. These molded parts 15e serve to clamp the fibers 20e',20e" in place such that the fibers 20e',20e" are oriented transversely to the longitudinal extent of the slit 12e, parallel to the plane of FIG. 2e, with their free ends abutting one another at an acute angle (in a roof-like manner). Similarly, the free edge surfaces of the foils 17e abut one another at an acute angle. A follower 11e extends between the two sealing strips 13e as shown in FIG. 2e. In view of the fact that the thin foils 17e are positioned with their free edge surfaces tightly abutting one another and against the follower 11e, a virtually hermetic seal is provided. Furthermore, no substantial frictional or distorting forces act on the follower 11e, and measuring errors related to such forces are thereby avoided.

In FIG. 2g the slit 12g of a housing 1g is sealed off by means of two overlapping sealing strips 13g lying in a single plane. A follower 11g extends between the sealing strips 13g, near the center of the slit 12g. As shown in the enlarged sectional view of FIG. 12h, each of the sealing strips 13g may be made up of a layer of tightly bundled fibers 20g' (formed for example of a synthetic plastic material) which are coated on one side with a thin layer 17g of a synthetic material, and which are bounded on the other side by a layer of tightly bundled fibers 20g'. In this preferred embodiment, the tightly bundled fibers 20g" are formed of a metal. The fibers 20g',20g" are oriented to run transversely to the longitudinal extent of the slit 12g". The sealing strips 13g are cemented in place to outer surfaces 14g of the casing 1g adjacent to the slit 12g.

In FIGS. 2k and 2l there is shown a housing 1k which defines a slit 12k. This slit 12k is sealed off by a flat sealing strip 13k through which a sword shaped follower 11k reaches. In this embodiment, the sealing strip 13k is made up of a plurality of tightly bundled fibers 20k (for example synthetic plastic fibers) which are oriented to run parallel to one another in the direction of the longitudinal extent of the slit 12k. Thus, in this embodiment, in contrast to the embodiments described above, the fibers of the sealing strip 13k are oriented perpendicular to the plane of FIG. 2k rather than in the plane of FIG. 2k. The fibers which make up the sealing strip 13k are clamped at their ends in each case between two metal strips 15k. These strips 15k are fastened in each case to the two ends of the housing 1k in any suitable manner so as to extend transversely to the longitudinal extent of the slit 12k. As shown in FIG. 2k, the metal strips 15k can be secured to outer surfaces 14k of the housing 1k adjacent to the slit 12k by means of fasteners. As shown in FIG. 2l, the follower 11k is positioned to move longitudinally along the slit 12k in the middle of the sealing strip 13k between paralled fibers 20k. The follower 11k is oriented in a plane perpendicular to the sealing strip 13k and the plane of FIG. 2l.

In FIG. 2m the slit 12m of a housing 1m is sealed off by means of two sealing strips 13m which are arranged in roof form in cross-section. A follower (not shown) extends between the two sealing strips 13m at the apex of the roof form. As shown in the enlarged sectional view of FIG. 2n, the sealing strips 13m include in each case a thin foil 17m formed of a synthetic plastic material. A layer of parallel fibers 20m',20m" of a suitable synthetic material is cemented to each side of the foil 17m. These fibers 20m',20m" are oriented to run parallel to the longitudinal extent of the slit 12m, perpendicular to the plane of FIG. 2m. The sealing strips 13m are clamped at their ends between two V-shaped molded parts 15m which in each case are fastened to the two ends of the housing 1m in any suitable manner to extend transversely to the longitudinal extent of the slit 12m, across the slit 12m between the outer surfaces 14m of the casing 1m adjacent to the slit 12m. Of course, it should be understood that these molded parts 15m are positioned only at the ends of the slit 12m and do not extend throughout the length of the slit 12m. The follower extends through the slit 12m between the foils 17m, in the region between the molded parts 15m. Since the thin foils 17m abut one another at an angle, the sealing strips 13m permit a virtually hermetic seal.

In the embodiments of FIGS. 2a through 2n, the fibers 20 are perferably formed of a material that provides a largely permanent elastic restoring force. For example, a wide range of synthetic fibers and natural fibers are suitable for use in this invention. Such elastic restoring forces cause the fibers 20 of the two sealing strips 13 to lie against on another tightly on both sides of the follower 11. Despite this tight engagement of the bundled fibers 20 with one another, only extremely slight frictional forces are exerted on the follower 11 during measuring movement of the follower 11. For this reason, measuring errors attributable to deformations of the follower 11 are substantially eliminated. Furthermore, since the individual fibers 20 of the sealing strips 13 are largley independent of one another, the bending open of the fibers 20 in the zone of the follower 11 does not affect the fibers outside the zone of the follower 11. For this reason, substantially no unclosed zones develop in the measuring direction at the ends of the follower 11. In addition to their covering or sealing function, the bundled fibers 20 (which are characterized as described above with an elastic restoring force) also provide a carrier function in that they can be used to support at least one thin layer 17 which does not itself provide substantial elastic restoring forces. As shown above, this thin layer 17, which perferably takes the form of a thin plastic (synthetic) foil, can be joined at one side or at both sides to a layer of fibers 20, as for example by means of a suitable cement. Furthermore, a layer of bundled fibers can also be mounted on one side or on both sides of a coating, preferably a coating of a plastic or a soft foam rubber.

In some applications, it is particularly advantageous to provide a layer of bundled glass fibers or metal fibers on the outer surface of the sealing strips. For example, if the sealing strips must function in an environment where there is a risk of contact with red hot metal chips or shavings, such metal or glass fibers provide important advantages. Furthermore, a layer of metal fibers simultaneously brings about a desired shielding against electromagnetic interference on the functioning of the scanning unit. Sealing strips built in accordance with this invention may be made up of any combination of the fiber materials described above, or with other fiber materials suitable for particular applications.

It should be understood that the present invention is not restricted to use with encapsulated photoelectric measuring systems. To the contrary, the present invention can readily be adapted for use with encapsulated optical, magnetic, inductive or capacitive measuring systems. In the use of encapsulated optical measuring systems, such as interferometers for example, the follower can be connected for example with a reflector of the interferometer as disclosed in German Patent No. 24 21 371 and with a reflector of the interferometer and with a mirror of an autocollimator measuring system as disclosed in German Patent No. 24 25 066.

From the foregoing it should be apparent that a wide range of changes and modifications to the preferred embodiments described above will be apparant to those skilled in the art. It is therefore intended that the foregoing detailed description be regarded as illustrative rather that limiting, and that it be understood that it is the following claims, including all equivalents, which are intended to define the scope of this invention.

I claim:

1. In an encapsulated measuring device for measuring the relative position of first and second objects movable with respect to one another, said device comprising: a housing adapted to be coupled to the first object and defining a slit which extends along a measuring direction; a follower adapted to be coupled to the second object and extending through the slit into the housing; and a measuring component disposed within the housing and coupled to move with the follower, the improvement comprising:

flexible covering means for sealing the slit around the follower as the follower moves along the slit, said covering means comprising at least one sealing strip which comprises a plurality of tightly bundled fibers and a thin sheet of flexible material secured between the bundled fibers to reduce permeability of the sealing lips;

said fibers comprising an elastic material which generates a restoring force when deflected by the follower;

said fibers comprising first and second sets of fibers, wherein the first set of fibers is positioned inside the thin sheet between the thin sheet and the follower and the second set of fibers is positioned outside the thin sheet.

2. The invention of claim 1 wherein the fibers are oriented transversely to the measuring direction.

3. The invention of claim 1 wherein the fibers are oriented to extend parallel to the measuring direction.

4. The invention of claim 1 wherein the thin sheet is secured at one side of the bundled fibers.

5. The invention of claim 1 wherein the sealing strip further comprises a coating secured to the bundled fibers at one side of the strip.

6. The invention of claim 1 wherein the sealing strip further comprises a coating secured to the bundled fibers at both sides of the strip.

7. The invention of claim 1 wherein the thin sheet is secured to the fibers by a cement.

8. The invention of claim 5 wherein the thin sheet and the coating comprise synthetic materials.

9. The invention of claim 6 wherein the thin sheet and the coating comprise synthetic materials.

10. The invention of claim 1 wherein the bundled fibers comprise synthetic fibers.

11. The invention of claim 1 wherein the bundled fibers comprise glass fibers.

12. The invention of claim 1 wherein the bundled fibers comprise natural fibers.

13. The invention of claim 1 wherein the bundled fibers comprise metal fibers.

14. In an encapsulated measuring device for measuring the relative position of first and second objects movable with respect to one another, said device comprising: a housing adapted to be coupled to the first object and defining a slit which extends along a measuring direction; a follower adapted to be coupled to the second object and extending through the slit into the housing; and a measuring component disposed within the housing and coupled to move with the follower, the improvement comprising:

a pair of sealing lips, each mounted to the housing on a respective side of the slit such that the follower extends between the sealing lips and is slidable along the sealing lips, and the sealing lips seal the slit around the follower;

each of said sealing lips comprising a respective array of tightly bundled fibers positioned to contact and seal against the follower while minimizing frictional forces between the sealing lips and the follower and associated deformation of the follower, said fibers comprising an elastic material which generates a restoring force when deflected by the follower;

said sealing lips further comprising a pair of thin sheets of flexible material, each secured between the fibers of respective one of the arrays of tightly bundled fibers such that a portion of the fibers of each of the sealing lips is positioned between the follower and the respective thin sheet of flexible material and this portion of the fibers is pressed into contact with the follower in the region of the follower, and the fibers press the thin sheets into contact with one another along the slit in regions not occupied by the follower, said thin sheets operating to reduce permeability of the sealing lips;

individual ones of said fibers movable substantially independently of one another such that deflection of fibers by the follower in a contact zone is substantially confined to the contact zone, thereby enhancing sealing of the thin sheets of the sealing lips outside the contact zone.

* * * * *

UNITED STATES PATENT AND TRADEMARK OFFICE
CERTIFICATE OF CORRECTION

PATENT NO. : 4,580,346                    Page 1 of 2
DATED      : April 8, 1986
INVENTOR(S): Alfred Reichl It is certified that error appears in the above-identified patent and that said Letters Patent is hereby corrected as shown below:

ON THE TITLE PAGE:

IN THE SECTION ENTITLED "OTHER PUBLICATIONS"

After "IBM" please insert --Tech.--.

IN THE BRIEF DESCRIPTION OF THE DRAWINGS

In column 2, line 55, please delete the numerals "21" and substitute therefor numeral --2-- and immediately thereafter the lower case letter --1-- in italics;

In column 2, line 56, please delete the numerals "21" and substitute therefor numeral --2-- and immediately thereafter the lower case letter --1-- in italics.

IN THE DETAILED DESCRIPTION OF THE
PRESENTLY PREFERRED EMBODIMENTS

In column 3, line 10, please delete "with" and substitute therefor --within--;

In column 4, line 58, please delete the numerals "21" and substitute therefor numeral --2-- and immediately thereafter the lower case letter --1-- in italics;

UNITED STATES PATENT AND TRADEMARK OFFICE
CERTIFICATE OF CORRECTION

PATENT NO. : 4,580,346

DATED : April 8, 1986

INVENTOR(S) : Alfred Reichl

It is certified that error appears in the above-identified patent and that said Letters Patent is hereby corrected as shown below:

In column 4, line 63, please delete the numerals "21" and substitute therefor numeral --2-- and immediately thereafter the lower case letter --1-- in italics;

In column 5, line 22, please delete "perferably" and substitute therefor --preferably--;

In column 5, line 27, please delete "against on" and substitute therefor --against one--;

In column 5, line 35, please delete "largley" and substitute therefor --largely--;

In column 5, line 46, please delete "perferably" and substitute therefor --preferably--.

Signed and Sealed this

Seventeenth Day of May, 1988

Attest:

DONALD J. QUIGG

*Attesting Officer*  *Commissioner of Patents and Trademarks*